US006475259B1

(12) United States Patent
Thomas et al.

(10) Patent No.: US 6,475,259 B1
(45) Date of Patent: Nov. 5, 2002

(54) COATING AGENT AND COATED PARTICULATE FERTILIZERS

(75) Inventors: Donald Ray Thomas, Jackson; Corinne Grady Ciaccio, Madison; Kerry Collins, Clinton, all of MS (US)

(73) Assignee: Mississippi Chemical Corporation, Yazoo City, MS (US)

( * ) Notice: Subject to any disclaimer, the term of this patent is extended or adjusted under 35 U.S.C. 154(b) by 0 days.

(21) Appl. No.: 09/429,033

(22) Filed: Oct. 29, 1999

(51) Int. Cl.$^7$ .............................. A10N 25/00; C05C 1/00
(52) U.S. Cl. ............................... 71/64.07; 71/59
(58) Field of Search .............................. 71/64.01, 64.02, 71/64.07, 59

(56) References Cited

U.S. PATENT DOCUMENTS

| | | | |
|---|---|---|---|
| 3,290,139 A | * 12/1966 | Campbell et al. | 71/30 |
| 4,042,366 A | * 8/1977 | Fersch et al. | 71/29 |
| 4,521,239 A | 6/1985 | Simms et al. | 71/27 |
| 5,360,465 A | * 11/1994 | Buchholz et al. | 71/11 |
| 5,423,897 A | 6/1995 | Hudson et al. | 71/28 |
| 5,704,962 A | * 1/1998 | Navascues | 71/64.07 |

FOREIGN PATENT DOCUMENTS

| | | |
|---|---|---|
| EP | 0 113 687 | 7/1984 |
| EP | 0 255 665 | 2/1988 |
| EP | 0 574 306 | 12/1993 |
| EP | 0 692 468 | 1/1996 |

OTHER PUBLICATIONS

PCT Written Opinion, Sep. 14, 2001.
John B. Tuttle, "The Petroleum Waxes", *Petroleum Products Handbook*, Section 10, pp. 10–1—10–30, 1960.
G.E. Unmuth, "Petroleum Waxes—Their Composition and Physical Properties", Paper given at the CSMA Convention in Chicago, IL, May 1975, 18 pp.
E.A. Liegel, et al., "Evaluation of Sulfur–coated Urea (SCU) Applied to Irrigated Potatoes and Corn", Agronomy Journal, vol. 68, May–Jun. 1976, pp. 457–463.
V.D. Akolkar, et al., "Coating Agents for Hygroscopic Fertilisers", Fertilizer News, vol. 41, pp. 59–65, Dec. 1996.

* cited by examiner

*Primary Examiner*—Stanley S. Silverman
*Assistant Examiner*—Eileen E. Nave
(74) *Attorney, Agent, or Firm*—Oblon, Spivak, McClelland, Maier & Neustadt, P.C.

(57) ABSTRACT

A coated fertilizer is provided along with a method for producing the coated fertilizer, where the coated fertilizer has a coating made of at least one amine compound which is a primary, secondary or tertiary, straight or branched hydrocarbon chain amine or an amine containing a cyclic hydrocarbon radical and; a microcrystalline wax, a paraffin wax or a soft synthetic wax.

22 Claims, No Drawings

COATING AGENT AND COATED PARTICULATE FERTILIZERS

BACKGROUND OF THE INVENTION

1. Field of the Invention

The present invention relates to particulate materials with a protective water vapor-barrier coating. More specifically, the invention relates to coated particulate fertilizers such as ammonium nitrate with a blend of amines and microcrystalline and/or synthetic waxes.

2. Discussion of the Background

Particulate fertilizers, stored in bulk, will absorb moisture from the atmosphere at rates depending on the composition of the chemical salt, temperature of the solid and the vapor pressure of water in air (Physical Properties of Fertilizers and Methods for Measuring Them, Bulletin Y-147, National Fertilizer Development Center, October 1979). It is generally understood that the quality of particulate fertilizers can be improved by reducing their moisture content during production and by preventing moisture absorption during storage. This is especially true for fertilizers stored in large bulk piles where no dehumidification is provided.

Various coatings have been proposed for fertilizers. Obrestad et al, U.S. Pat. No. 5,472,530, disclose coatings designed to produce free flowing ammonium nitrate particles. Simms et al, U.S. Pat. No. 4,521,239, disclose protective coatings for ammonium nitrate comprising a combination of an amine and a polysiloxane. Other coatings for fertilizers are disclosed by Novascues et al, EP 00574306; Kjohl et al EP 00255665; and Ureng et al U.S. Pat. No. 5,294,251. These coatings are taught to provide limited uptake of water by the fertilizer stored in bulk in the open air in a wet atmosphere, limit the formation of significant encrustation, reduced dust formation and hygroscopicity, corrosion resistance properties and water proofing properties.

Most commercially available coating technologies for fertilizers such as ammonium nitrate claim to provide anti-caking properties and even moisture barrier properties. However, the mechanism for their efficacy is generally not discussed other than saying that the materials are hydrophobic. Common commercially available coating agents include Galoryl alkyl-aryl sulphonates, anionic and nonionic surfactants (sold by Lobeco Industries), Lilamine and Armoflo fatty amine coatings (sold by Akzo Nobel), Petro-Ag (an amine based coating marketed by Witco Corporation), Perflow (another amine based coating marketed by IWC Stockhausen) and Radiamine (sold by Fina Chemicals).

Solid fertilizers, and particularly ammonium nitrate, are usually coated with active anti-caking agents. These anti-caking agents serve to reduce the contact area between particles where fertilizer salts are soluble and where these salts may recrystallize from saturated aqueous film layers between particles (D. C. Thompson, 1972). However, commercially available anti-caking agents tend to be poor water vapor barriers.

In the case of ammonium nitrate, the anti-caking agent may serve to prevent significant caking in storage, but moisture will continue to be absorbed through the coating layer, causing saturation of internal additives and desiccant phases. Once these desiccant phases become saturated, undesirable crystal phase transitions can occur during thermal cycling resulting in product degradation. This is evidenced by fluff formation over the surface of bulk piles, crust layer formation beneath the fluff layer and deep pile caking as moisture migrates vertically in the bulk pile.

SUMMARY OF THE INVENTION

Accordingly, one object of this invention is to provide a suitable anti-caking agent that also has superior water vapor barrier properties.

Another object of the present invention is to provide a coated particulate fertilizer that is protected from caking and from moisture absorption by the coating.

This object and other objects of the present invention have been satisfied by the discovery of a process for application of amines or blends of amines and at least one of microcrystalline waxes, paraffins and/or synthetic waxes to particulate fertilizers which provide excellent resistance to caking in bag and bulk storage and the resulting coated particles provided. Furthermore, these blends provide resistance to water vapor absorption by the fertilizer thus increasing the storage life of the product.

DETAILED DESCRIPTION OF THE INVENTION

Any material which is to be successful as a coating agent for particulate fertilizers must possess several desirable characteristics. The coating agent must be compatible with the fertilizer material, i.e., it must not cause deterioration of the fertilizer nor render it hazardous, which is a particular concern with ammonium nitrate. Since the coated fertilizer is frequently handled by unprotected personnel and is applied to crop land, the coating agent must be nontoxic. In some instances where a hygroscopic salt is being coated such as in the case of ammonium nitrate, the fertilizer readily absorbs water from the ambient air. This results in caking and breakdown of the prilled fertilizer. Accordingly, an acceptable coating agent must substantially impede or eliminate moisture absorption by the particulate hygroscopic fertilizer. Another important aspect of the coating is that the coating on the particles must be sufficiently uniform to prevent particle-to-particle contact in uncoated areas of the particles. If this type of contact is not prevented during storage of the ammonium nitrate, caking of the fertilizer particles will result as bonding occurs between particles where there is insufficient coating material to prevent exposed surfaces of the particles from contacting each other. The raw materials for the coating agent must be in abundant supply so that production of coated fertilizer product in volume is not impeded. The coating agent must firmly bond to the fertilizer particles from the time it is applied until the coated fertilizer is applied to the crop land.

Other beneficial characteristics which the coating agent should possess, but which are not mandatory, are that the cost of the ingredients on a per ton fertilizer basis should be reasonable and it should be able to be easily handled from an operational standpoint. However, with regard to both of these factors, some expense and inconvenience can be tolerated as long as a superior coated fertilizer product is produced.

The coating agent of the present invention has been found to satisfy all of the above-described characteristics. The present coating agent is a mixture of an amine and a microcrystalline and/or synthetic wax.

The amine component of the present coating composition is a material which is semisolid or solid at room temperature. The amine should melt at a temperature of about 43° C. to about 93° C. and should not decompose at these temperatures. Suitable amines include primary, secondary and tertiary, straight and branched chain amines of 12 to 18 carbon atoms per carbon chain, as well as amines containing cyclic hydrocarbon radicals of 5 to 8 carbons. Saturated cyclic amines and saturated polyamines may also be used as long as they possess the above-desired physical properties. Mixtures of amine may also be used, and in fact, long chain fatty amines as obtained industrially are frequently a mixture of amine compounds and are quite suitable for use in the present invention. Amines containing unsaturated hydrocarbon and aromatic hydrocarbon radicals should be avoided when coating the likes of ammonium nitrate because of the increased danger of forming hazardous compositions. This is substantially much less of a factor when relatively less hazardous substrates are to be coated. A preferred amine composition is a mixture of amines having the formula:

wherein x is 6, 7 and 8. This particular mixture is characterized as follows:

(a) Solid at 24° C.

(b) Melting point (° C.): 49°–54° C.

(c) Freezing point (° C): 43° C.

(d) Specific gravity (150/60), g/cc: 0.794

(e) Viscosity (66° C.) cp:3

(f) Colorless (g) 97% purity

The wax component of the coating composition should be a soft or hard microcrystalline wax, a paraffin wax or a soft synthetic wax. The wax component must be either miscible with the amine component to provide a single coating composition or be able to be coated simultaneously or sequentially along with the amine component onto the particulate fertilizer as part of a two part coating composition. Microcrystalline waxes are the product of tank bottoms from crude oils that have been dehydrated, deoiled, and depending on grade, decolored. In comparison to paraffin wax, microcrystalline waxes have higher melting points, a lower percentage of normal alkanes, more iso- and cycloalkanes, higher molecular weights, higher flash points and broader melting point endotherms. The hardness of microcrystalline wax can be altered by a number of factors including oil content and the quantity of other additives such as polyethylene. These and other properties of microcrystalline waxes are described in Tuttle, The Petroleum Waxes in Petroleum Products Handbook and Unmuth, Petroleum Waxes—Their Composition and Physical Properties, CSMA Convention, Chicago, May 1975. The entire contents of these references are incorporated herein by reference.

Synthetic waxes are paraffins that are produced by the Fischer-Tropsch reaction where coal is burned in gas generators in the presence of oxygen to yield CO and $H_2$. The gas stream is then converted to hydrocarbons over an iron catalyst and the resulting products refined to various synthetic-paraffin grades of wax. The synthetics have very narrow ranges of physical properties. Petroleum waxes generally have hydrocarbons in the $C_{18}$–$C_{70}$ range. Microcrystalline waxes, on the other hand, have hydrocarbons in the $C_{36}$–$C_{70}$ range with small to very small needle-like crystals. Paraffin waxes have hydrocarbons in the $C_{18}$–$C_{56}$ range with plate-like crystals.

Preferred microcrystalline waxes should melt at a temperature of about 60° C. to about 100° C., have a ATSM needle penetration value of about 3 to 60 at 25° C. and are composed of 80 to 95% normal alkanes and 20 to 5% non-normal alkanes. Mixtures of microcrystalline waxes may also be used. More preferred microcrystalline waxes melt at a temperature of 74 to 96° C., a ATSM needle penetration of about 3 to 35 at 25° C. and are composed of 85 to 93% normal alkanes and 15 to 7% non-normal alkanes. Commercially available microcrystalline waxes that meet these criteria are Be Square 195 Amber, FR 5315, Victory Lite microcrystalline wax, C1035 microcrystalline wax, and SP200 soft synthetic wax, all available from Bareco Products of Rock Hill, S.C.

The amine and wax coating ingredients may be applied to fertilizer particles by any method which is industrially acceptable for providing the particles with a uniform and acceptable coating of the coating agent on the fertilizer particles. Both batch and continuous procedures can be used to mix the ingredients of the present composition. Since the amine used is most commonly solid at ambient temperatures, it is usually heated to a temperature sufficient to liquify the same. A temperature ranging from 54° to 93° C. normally is sufficient to liquify the amine. The amine is then mixed with the wax in the amount desired for a time sufficient to obtain a homogeneous mixture. Mixing may be done in a simple stirred tank, in an in-line static mixer or other such similar devices sufficient to prepare a homogeneous mixture of the two ingredients. The mixing device as well as all production apparatuses should be made of materials which are not corroded by the reactants. The amount of mixed material prepared should be sufficient to coat a given quantity of fertilizer particles to a given depth of coating agent.

The amount of amine combined with the wax can vary over a range with the essential requirement being a ratio of reactants which yields a coating composition having the characteristics stated above. A broad ratio range of the two reactants can be used with an acceptable amine:wax ratio ranging from 5/95 to 95/5. Ratios on either side of these limits can be used, however there is no advantage to be gained by exceeding these limits. A preferred operating range is an amine:wax ratio range of 70/30 to 90/10.

The coating mixture prepared may be used immediately or it may be stored for later use. The nature of the coating mixture is such that personnel when handling the product should use suitable protective clothing. Preferably, the coating mixture is stored for no longer than a few days in the molten form since at elevated temperatures (above ambient) oxidation or decomposition is promoted. If the coating mixture is to be stored for a period of time longer than several days, the mixture should be solidified by cooling, and then remelted before use. Storage under an inert atmosphere of a gas such as nitrogen is preferred.

Neither the coating mixture of the invention nor the amine reactant should be allowed to come into contact with hot ammonium nitrate melt. Because the amine and the wax are both organic materials, contact of the amine or the wax with hot ammonium nitrate could produce a potentially hazardous situation. For this reason, all spills and residual ammonium nitrate with applied coating should be adequately disposed of and not recycled to the ammonium nitrate plant. For fertilizer materials which are not under such hazardous constraints, these precautions can be reduced or eliminated.

The coating mixture once prepared and ready to use is in the liquid state. The mixture can be applied to the particulate fertilizer by any acceptable and reasonable method of applying a liquid to a particulate solid substrate in high volume commercial amounts. Usually, the warmed mixture is applied by such techniques as spraying, film rolling, spraying the liquid mixture onto a rotary drum onto which the fertilizer particles are dropped, and the like. The coating mixture must be kept at a temperature high enough so that the coating mixture remains liquid during application to the fertilizer particles. A temperature within the range of about 54° to about 93° C., preferably 65° C. to 82° C. is sufficient to keep the mixture molten. Unlike some coating processes, it is not necessary to heat the fertilizer particles. In the case of ammonium nitrate fertilizer, the particulate product as obtained from production is at an elevated temperature. From the production standpoint, the particulate ammonium nitrate product can be conveniently coated while at a temperature ranging from 31° C. to 35° C. The nature of the coating mixture is such that it can be easily applied to ammonium nitrate fertilizer having a temperature range of 16° to 110° C.

No matter what method is used to coat the fertilizer particles, the only relatively critical factor with respect to contact time of the liquidified coating agent with the particles is that contact should only be long enough to obtain a uniform coating. When the roll coating technique is used, the particles should only roll a distance sufficient to obtain a uniform particle coating.

Once the particles are coated, they only need to be cooled before being bagged. In the event the coating is applied to cool fertilizer particles, no further cooling of the particles is necessary. In the case of ammonium nitrate forced convective cooling within the coating apparatus may be utilized, but is not necessary. Cooling of the particles, however, aids in the solidification of the applied coating agent. The coating agent will solidify by the conduction of heat away from the coating by the relatively cooler underlying fertilizer substrate when the fertilizer particles have been cooled to within the preferred temperature range. If convective cooling of the coated particles is employed, care must be taken to not cool the particles so fast that the coating agent does not have sufficient time to uniformly coat the particles.

The coating conditions are such that the weight of coating applied is that which provides a sufficiently protective coating. Usually, an amount ranging from 0.005 to 0.20% by weight is sufficient to give good results, with a more preferred amount ranging from 0.01–0.05% by weight. If the coating is less than 0.005% by weight, the particles may not be coated with a sufficient amount of coating agent to provide a uniform coating having the necessary characteristics described above. If the coating agent is applied in an amount in excess of 0.20%, additional costs are incurred without any further benefits being realized.

The coating agent of the invention may be utilized to coat materials other than fertilizer. Indeed, just about any particulate solid material which has a tendency to cake may be coated. The solid being coated must be compatible with the coating agent.

Having generally described this invention, a further understanding can be obtained by reference to certain specific examples which are provided herein for purposes of illustration only, and are not intended to be limiting unless otherwise specified.

EXAMPLES

Example 1

Because thin layer coatings applied to particulate fertilizers are sometimes no thicker than 1–2 microns, it can be difficult to measure the water vapor permeability of these coating as applied to the fertilizer particles. Our early research also focused on screening various coating formulations by studying the hydrophobicity and water vapor barrier properties of neat coating system. A low water vapor transmission rate (WVTR) means better vapor barrier properties.

Screening Methods

Our early research used techniques designed to screen the hydrophobic properties of a large numbers of candidate coating materials. The classes of candidates included amides, ester, fatty acids, fatty alcohols, fatty amines, glycerol esters, hydrogels, linseed oil, silicones, sorbital esters, various surfactants, emulsions and waxes. In total, 228 different coating formulations were screened.

The first technique measured water drop contact angles on coated wafers of ammonium nitrate. The wafers were cast from molten AN containing the $Mg(NO_3)_2$ additive. The wafers, approximately 2 inches in diameter and ¼ inch thick, were coated by applying the formulated coating agent with an airbrush. The wafers were mounted on a rotating stage controlled by a variable speed drive. As the stage rotated, the wafer passed perpendicular to the path of the sprayed coating. The wafers were preheated to 170° F. and the coating was heated to a suitable temperature as well. Each wafer was coated by 4 to 8 passes over the path of the airbrush. The contact angle of a water drop on the coated wafers was then measured by Quantitative Image Analysis (QIA). The image of the water drop was captured as it was placed on coated wafer using a Charge Coupled Device camera using National Institute for Health Image 1.5 QIA software. The external contact angle was then recorded using the software tools. The water drop contact angle (WDCA) measured on wafers coated with 70% amine:30% siloxane coating agent is approximately 95° prepared in accordance with U.S. Pat. No. 4,521,239. This technique was used to screen for hydrophobic coatings with WDCA less than 90°. The most promising classes of materials identified by this technique included microcrystalline and synthetic waxes.

The second technique, thin film water vapor transmission rate (WVTR), was used to screen candidate materials based on their ability to form water vapor barriers. These experiments were performed on the various neat coating systems investigated by forming films of these systems on cellulose acetate. Cellulose acetate is an excellent support because it is itself such a poor water vapor barrier (Hagenmaier and Shaw, 1991 and Vivian et al 1985). The WVTR for cellulose acetate was first quantified alone. The measured WVTR for the coating agent film was then mathematically corrected for the affect of the cellulose acetate substrate by conventional methods as described in Hagenmaier et al, "Permeability of Coatings Made with Emulsified Polyethylene Wax" *J. Agric. Food Chem.*, Vol 39, No. 10, 1705–1708, (1991) and Hagenmaier et al, "Permeability of Shellac Coatings to Gases and Water Vapor" *J. Agric. Food Chem.*, Vol. 39, No. 5, 825–829 (1991), the contents of which are hereby incorporated by reference. ASTM Method F1249-90, "Standard Test Method for Water Vapor Transmission Through Plastic Film Using a Modulated Infrared Sensor", was used to quantify the WVTR for the various coatings investigated. A Modern Controls Inc. Permatran-W 3/31 was used to collect the WVTR data.

Example 2

One of the most important aspects of investigating coating agents is the casting and testing of our present coating as films. After the material was obtained as a film, it was investigated as to its water vapor transmission rate (WVTR) with the Modern Controls Inc. Permatran-W3/31.

All films were prepared in the following manner. Films were cast on a support of 5 mil cellulose acetate, which was adhered to a smooth surface. Coating agent material was warmed to a clear solution, not boiling, and combined with warmed hexane to yield a 10–15% solution of coating agent by volume. The range in concentrations is due to the different solubilities in hexane. A Byk Gardner square casting tool with casting levels of 5–50 mils was utilized to make the films. A sample volume of 8 mL was poured into the center of the casting tool, which was turned to yield a 50 mil film, and the tool was steadily dragged across the cellulose acetate. The film was allowed to sit undisturbed overnight. Films were tested as to their WVTR after a minimum of 24 hours from casting.

Prior to testing, each film was masked with aluminum tape mask provided by Modern Controls Inc. Masking allowed only 5 $cm^2$ of the film to be tested at one time. A consistent thickness film could be obtained for this small area. The films also had a cover sheet of 5 mil cellulose acetate that prevented any damage to the coating agent film. This created a coating agent "sandwich" between two layers of cellulose acetate.

Each film was tested at 100° F. and 100% relative humidity (RH) with a nitrogen flow of 100 sccm. Initial testing revealed that four 15 minute measurements of the WVTR yielded a consistent value. Testing for shorter periods of time would not insure that the true WVTR had been reached, and longer periods of testing resulted in damage to the film. Each test consisted of duplicate runs of the masked, sample coating agent film with a standard Mylar film. No conditioning time, which is the flow of the water vapor without measuring the rate, was used.

After the WVTR was measured, each film thickness was determined in 10 places with a micrometer, the highest and lowest measurements were discarded, and the remaining values averaged. Film thicknesses must be greater than 0.16 mils and less than 0.44 mils thick to be compared to other films. The WVTR obtained from the Permatran instrument and the average measured film thickness were entered into a programmed Excel spreadsheet to calculate the permeability, in accordance with the methods described in the Hagenmaier et al references noted above.

Table 1 below provides typical thin film WVTR data for the systems studied.

TABLE 1

Water Vapor Transmission Rates of Coating Agents Tested

| Coating System | WVTR g $H_2O/m^2$ day |
|---|---|
| 70% amine:30% microcrystalline wax A | 10 |
| 70% amine:30% microcrystalline wax B | 68 |
| 70% amine:30% Bareco synthetic wax C | 38 |
| 70% amine:30% reactive siloxane D | 130 |
| Galoryl ATH 626M E | 190 |
| 70% amine:30% Paraffin wax F | 204 |

A = Bareco Victory Lite soft microcrystalline wax
B = Bareco C1035 hard microcrystalline wax
C = Bareco SP200 soft synthetic wax
D = U.S. Pat. No. 4,521,239
E = Lobeco Industries, Lobeco, South Carolina
F = Bareco SC4095 soft paraffin wax To further support these hydrophobicity and thin film studies, batches of ammonium nitrate prills containing magnesium nitrate additive, were coated with a variety of coating agents.

Prill Coating Method

Ammonium nitrate prills obtained from a production plant final cooling stage, screened and uncoated, were used for all the laboratory and pilot scale evaluation and optimization trials. 2000 g batches for lab trials and 100 lb batches for pilot scale trials were reheated as necessary to between 120° and 180° F., depending on the design for a particular run. Formulated coated agent was applied using a hydraulic spray gun onto a tumbling bed of heated prills. Once coated, the prills continued to tumble for 10 minutes in the lab mixing drum and 15 minutes in the pilot scale mixing drum. Control tests using 70% amine: 30% reactive siloxane coating agent prepared in accordance with U.S. 4,521,239 were included in all trials. The actual coating levels were determined gravimetrically by placing 100 g of the ammonium nitrate particles on wet filter paper, through which is passed 1.4 liters of water to dissolve the ammonium nitrate. The residue remaining on the filter paper after drying and cooling is weighed by difference to determine the level of coating. All ammonium nitrate prills used in this study contained approximately 1.83% $Mg(NO_3)_2$ additive.

The coating level for each system was approximately 0.045 wt. %. Accelerated moisture absorption rate experiments were then conducted by humidifying the coated prills as they were fluidized in a controlled environment chamber (28° C./58% RH). The first order absorption rate constants were determined and are shown in Table 2.

Accelerated Moisture Absorption Rate Method

Accelerated moisture absorption rate (AMAR) data were collected on lab coated prills. 300 g of coated prills were humidified in a fluid bed inside a controlled environment chamber (81 OF, 54% RH). Samples were collected every 5 minutes and moisture analyses determined by Karl-Fischer titration. The moisture content of the prills vs. time was then regressed linearly. If the rate is directly proportional to the concentration of $H_2O$, the reaction is said to be first order, since Rate=$d[H_2O]/dt$-$d[H_2O]/dt$ $K_r[H_2O]^n$ for $n$=1 where $K_r$ is the rate constant. By regressing the $\log_{10}$ of K-F data vs. time, the slope of the line can be used to calculate $K_r$, where:

slope=$K_r/12.303$

AMAR data for the lab-coated prills was collected in triplicate. These data were used to further screen candidate coating materials which had thin film WVTR superior to the control.

TABLE 2

Accelerated Moisture Absorption Rate Constant
for Coating Agents Tested
on Lab Coated Ammonium Nitrate Prills

| Coating | Rate constant k, $\min^{-1}$ |
|---|---|
| 70% amine:30% microcrystalline wax A | 0.0091 |
| 70% amine:30% microcrystalline wax B | 0.0083 |
| 70% amine:30% synthetic wax | 0.0075 |
| 70% amine:30% reactive siloxane | 0.0098 |
| Galoryl ATH 6-26M | 0.0119 |
| 70% amine:30% Paraffin wax | 0.0119 |

The relationship between measured thin film WVTR and coated prill first order absorption rate constant is observed to be quite linear.

Example 3

Coated prill bulk and bag storage tests were used to compare the storage quality of ammonium nitrate fertilizer coated with various formulations. These storage tests validate the predictions of the two screening techniques. Systems which clearly out performed the control (70% amine:30% reactive siloxane) included those containing either microcrystalline or synthetic waxes blended with amine. These novel systems exhibited less surface degradation and less moisture absorption throughout the bulk pile than the control or other systems containing polyalkyl functional siloxanes.

Prills were coated as described in Example 1.

Accelerated Caking Tests

Accelerated caking trials were performed by subjecting the prilled fertilizer to a specified pressure for 24 hours inside a sample cylinder. The severity of caking is measured by the amount of pressure required to force fertilizer through an opening located on the bottom of the sample cylinder. In performing the test, 300 g of fertilizer is placed into the stainless steel sample cylinder (diameter 10 cm) and the cylinder is leveled. Pressure is applied using a ram inside the cylinder. After 24 hours under the specified pressure, the pressure is released and the cylinder is opened. Pressure is then applied to the fertilizer "plug" inside the cylinder, such as with the ram, in order to force the fertilizer through the opening at the bottom of the cylinder. The pressure (psi) required to force the fertilizer through this opening is proportional to the severity of caking of the fertilizer. The present tests were performed using a cylinder pressure of 90 psig. Caking tests were conducted on the freshly coated prills and after these materials had been humidified during the accelerated moisture absorption tests. Very little caking was observed (in most cases no caking) for the lab scale coating trials. Therefore, the caking index response was not used as a principle indicator of coating performance.

Storage Quality Evaluations

The quality of pilot plant coated ammonium nitrate prills was evaluated by storage in a controlled environment bulk warehouse for 3 months. Product was stored in plastic valve bags under 900-pound weights and in uncovered 400-pound capacity Plexiglas® bulk bins. The warehouse was programmed to daily cycle dry bulb temperature between 80° F. and 96° F. with a constant 50% relative humidity.

A single bag from each test was evaluated after one month and three months. After one month in storage under a 900-pound weight, the 5 test bags and one control were indistinguishable. After three months, none of the bags exhibited more than 75% bag-set. No significant caking or fines was observed during the bag storage tests. Additionally, after three months in bag storage, all of the coated materials contained less than 0.5% moisture.

Each Plexiglass® bulk bin was filled with approximately 400-pounds of pilot coated ammonium nitrate prills. These bins were examined monthly for three months. The amount of surface degradation (fluff and crust) was estimated and a segmented grain probe was used to collect moisture profile samples monthly. Additionally, after three-months in storage, a deep pile sample (~10" deep) was collected from each bin.

Quality Rating Method

A quality rating system was then used to rank the performance of the materials during a given trial.

The bulk bin observation and moisture profile data were used to differentiate the quality of the pilot plant coated materials. Each type of observation was ranked from lowest (poorest) to highest (best) for all the materials evaluated. The visual observations were then grouped into three categories of Low, Medium and High. A Low quality rating was assigned a value of 1, Medium was assigned a 2 and High was assigned a value of 3. The moisture profile data was similarly grouped. The quality ratings for all observations made on a given test were then summed to yield an overall quality rating both on a monthly basis and for the entire three month trial. These overall quality ratings were then used to rank the relative storage performance of the control and five test materials. This exercise allowed us to quantitatively rank the performance of the materials without relying completely on subjective opinions.

For example, during trials P119–P125, two synthetic waxes, two microcrystalline waxes and a siloxane based coating were compared to the control coating during a three month storage test.

The ranked quality ratings separated the six coating trials into two distinct groups. The top group, having the best quality ratings, included tests P119, P123 and P125. Indeed, these three were very similar in their overall rankings over the course of the three-month study. The bottom group of ranked quality ratings were also closely grouped and included P121 (control), P122 and P124. See the table 3 below.

The method used to rank the quality of the materials as shown in Table 3 is described below.

1. The bin observations and quality ratings were somewhat subjective. From Table 4 and Table 5 observations), one can see that materials which exhibited only 1 inch of soft crust with 0–¼" fluff were assigned a High rating, materials with 3 inches of soft crust and ⅛" of fluff were assigned a Medium rating and the bin with 4 inches of moderate crust and no fluff were assigned a Low rating. Here, crust was given more importance than fluff since little fluff formed during these trials.

2. Moisture profile data, collected using a segmented grain probe, were used to compare the prill moisture content of each bin at several different depths. For each depth, the range between the lowest moisture value and highest moisture values observed was divided into thirds. Data for a given material that fell into the bottom third was given a High rating (Low moisture=high quality). Likewise data failing into the upper third of the range was given a Low quality rating and so on.

3. Since no differences were noted in the one month bag observations, this did not impact the one month quality rankings. Differences in bagged material quality were noted at three months.

TABLE 3

Quality Ratings for Trials P119–P125.

| Test | 1-Month | 2-Months | 3-Months | Total |
|---|---|---|---|---|
| P119 amine:soft microcrystalline wax | 12 | 12 | 16 | 40 |
| P121 amine:siloxane control | 11 | 8 | 10 | 29 |
| P122 amine:polymethyloctadecylsiloxane | 7 | 8 | 9 | 24 |
| P123 amine:hard microcrystalline wax | 13 | 14 | 18 | 45 |
| P124 amine:hard synthetic wax | 10 | 7 | 13 | 30 |
| P125 amine:soft synthetic wax | 11 | 12 | 17 | 40 |

Thus, the overall quality of the materials studied was ranked as follows:
BEST                    WORST
P123→P119 & P125→P124→P121→P122

TABLE 4

One Month Bag and Bulk Bin Evaluation For Trials P119–P125

|  | P119 | P121 | P122 | P123 | P124 | P125 |
|---|---|---|---|---|---|---|
| Days in storage | 32 | 32 | 39 | 32 | 31 | 32 |
| Observed caking | none | none | none | none | none | none |
| Observed fines | none | none | none | none | none | none |
| % H$_2$O, 50 lb. bag | 0.36 | 0.38 | 0.38 | 0.31 | 0.36 | 0.36 |
| % Coating | 0.041 | 0.044 | 0.044 | 0.037 | 0.040 | 0.038 |

TABLE 5

One Month Bulk Bin Storage Evaluation for Trials P119–P125

| Bulk Bin moisture Profiles, % H$_2$O | P119-Bin | P121-Bin | P122-Bin | P123-Bin | P124-Bin | P125-Bin |
|---|---|---|---|---|---|---|
| Days in Storage | 32 | 32 | 39 | 32 | 31 | 32 |
| Surface | 3.18 | 3.22 | 1.73 | 2.29 | 4.14 | 2.66 |
| 2 inches | 3.69 | 4.18 | — | 2.98 | 3.56 | 3.28 |
| 5 inches | 1.30 | 1.48 | 1.71 | 1.34 | 1.46 | 1.33 |
| 7 inches | 0.79 | 0.85 | 0.83 | 0.72 | 0.75 | 0.68 |
| 10 inches | 0.62 | 0.45 | 0.71 | 0.57 | 0.54 | 0.65 |
| Fluff, inches | 0 | ¼ | 0 | <⅛ | <⅛ | ⅛ |
| Crust, inches | 1 | 1 | 4 | 3 | 3 | 3 |
| Crust hardness | Soft | Soft | Moderate | Soft | Soft | Soft |

Obviously, numerous modifications and variations on the present invention are possible in light of the above teachings. It is therefore to be understood that within the scope of the appended claims, the invention may be practiced otherwise than as specifically described herein.

We claim:

1. A coated fertilizer comprising an ammonium nitrate core and having a coating consisting essentially of
   (a) at least one amine compound which is a primary, secondary, or tertiary, straight or branched hydrocarbon chain amine or an amine containing a cyclic hydrocarbon radical and;
   (b) a microcrystalline wax, a paraffin wax or a soft synthetic wax.

2. The coated fertilizer of claim 1, wherein the amine is a single compound or mixture of amines which melts at a temperature of 43° C. to 93° C.

3. The coated fertilizer of claim 2, wherein the amine is a single compound or a mixture of amines which are primary, secondary or tertiary, straight or branched chain amines of 12 to 18 carbon atoms.

4. The coated fertilizer of claim 3, wherein the amine is a mixture of compounds of the formula CH$_3$—(CH$_2$—CH$_2$)$_x$—CH$_2$—NH$_2$ and wherein x is 6, 7, or 8.

5. The coated fertilizer of claim 1, wherein the amine and wax are present in the coating in a weight ratio that ranges from 5:95 to 95:5.

6. The coated fertilizer of claim 5, wherein the weight ratio ranges from 70:30 to 90:10.

7. The coated fertilizer of claim 1, wherein (b) is a microcrystalline wax.

8. The coated fertilizer of claim 7, wherein the microcrystalline wax is a single wax or mixture of microcrystalline waxes which melts at 60° C. to 100° C. and comprises from 80 to 95% normal alkanes and from 5 to 20% non-normal alkanes.

9. The coated fertilizer of claim 7, wherein the microcrystalline wax is a single wax or mixture of microcrystalline waxes which melts at 74° C. to 96° C. and comprises from 85 to 95% normal alkanes and from 7 to 15% non-normal alkanes.

10. The coated fertilizer of claim 1, wherein (b) is a paraffin wax.

11. The coated fertilizer of claim 1, wherein the fertilizer is an ammonium nitrate prill.

12. The coated fertilizer of claim 1, wherein the amount of coating ranges from 0.01 to 0.05% by weight.

13. The coated fertilizer of claim 12, wherein the amount of coating ranges from 0.01 to 0.05% by weight.

14. The coated fertilizer of claim 1, wherein the coating has a water vapor transmission rate of less than or equal to 130 g H$_2$O/m$^2$ day.

15. A method of coating an fertilizer comprising contacting the fertilizer with a mixture of at least one amine compound which is a primary, secondary or tertiary, straight or branched hydrocarbon chain amine or an amine containing a cyclic hydrocarbon radical; and a microcrystalline wax, a paraffin wax or a soft synthetic wax at a temperature of 16° C. to about 110° C. with fertilizer for a time sufficient to obtain a coating on the fertilizer particle, wherein the fertilizer is an ammonium nitrate particle.

16. The method of claim 15, wherein the mixture is applied to the fertilizer at a temperature ranging from 54° C. to 93° C.

17. The method of claim 15, wherein the amount of said mixture applied to said fertilizer ranges from 0.005% to 0.2% by weight.

18. The method of claim 15, wherein the microcrystalline wax is a single wax or mixture of microcrystalline waxes which melts at 60° C. to 100° C. and comprises from 80 to 95% normal alkanes and from 5 to 20% non-normal alkanes.

19. The method of claim 15, wherein the microcrystalline wax is a single wax or mixture of microcrystalline waxes which melts at 74° C. to 96° C. and comprises from 85 to 95% normal alkanes and from 7 to 15% non-normal alkanes.

20. The method of claim 15, wherein the amine is a single compound or mixture of amines which are primary, secondary or tertiary, straight or branched chain amine compounds of 12 to 18 carbon atoms.

21. The method of claim 15, wherein the amine and wax are present in the coating in a weight ratio that ranges from 5:95 to 95:5.

22. The method of claim 15, wherein the fertilizer is an ammonium nitrate prill.

* * * * *

UNITED STATES PATENT AND TRADEMARK OFFICE
CERTIFICATE OF CORRECTION

PATENT NO.    : 6,475,259 B1
DATED         : November 5, 2002
INVENTOR(S)   : Thomas et al.

It is certified that error appears in the above-identified patent and that said Letters Patent is hereby corrected as shown below:

Column 1,
Line 7, delete "vapor-barrier" and insert -- vapor barrier --

Column 9,
Line 21, delete "Plexiglass ®" and insert -- Plexiglas® --

Signed and Sealed this

Fifth Day of August, 2003

JAMES E. ROGAN
*Director of the United States Patent and Trademark Office*